(12) United States Patent
Burbridge et al.

(10) Patent No.: US 10,277,498 B2
(45) Date of Patent: Apr. 30, 2019

(54) ANALYSIS OF NETWORK PERFORMANCE

(71) Applicant: BRITISH TELECOMMUNICATIONS PUBLIC LIMITED COMPANY, London (GB)

(72) Inventors: Trevor Burbridge, London (GB); Philip Eardley, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 15/761,271

(22) PCT Filed: Sep. 26, 2016

(86) PCT No.: PCT/EP2016/072883
§ 371 (c)(1),
(2) Date: Mar. 19, 2018

(87) PCT Pub. No.: WO2017/060117
PCT Pub. Date: Apr. 13, 2017

(65) Prior Publication Data
US 2018/0270142 A1 Sep. 20, 2018

(30) Foreign Application Priority Data

Oct. 8, 2015 (EP) ..................... 15188952

(51) Int. Cl.
*G06F 15/173* (2006.01)
*H04L 12/24* (2006.01)
*H04L 12/26* (2006.01)

(52) U.S. Cl.
CPC .............. *H04L 43/50* (2013.01); *H04L 43/00* (2013.01); *H04L 43/08* (2013.01); *H04L 43/10* (2013.01); *H04L 43/12* (2013.01)

(58) Field of Classification Search
CPC .......... H04L 43/08; H04L 43/10; H04L 43/50
See application file for complete search history.

(56) References Cited

U.S. PATENT DOCUMENTS

| 6,363,056 B1 | 3/2002 | Beigi et al. |
| 7,912,934 B1 | 3/2011 | Melton et al. |
| (Continued) | | |

FOREIGN PATENT DOCUMENTS

| CN | 101151847 | 3/2008 |
| CN | 101505230 | 8/2009 |
| (Continued) | | |

OTHER PUBLICATIONS

"Multipath Tracking with Paris Traceroute"—Augustin et al, University Pierre and Marie Curie, Citeseerx, May 2007 https://hal.inria.fr/hal-01097558/document (Year: 2007).*
(Continued)

*Primary Examiner* — Randy A Scott
(74) *Attorney, Agent, or Firm* — Nixon & Vanderhye PC

(57) ABSTRACT

Methods and apparatus are disclosed for analyzing performance of a network. The method may comprise: obtaining first and second probe measurements resulting respectively from a test-message being sent from a first node and having a second node as the target thereof, and from a test-message being sent from the second node and having the first node as the target thereof, associated probe response-messages triggered by receipt and local processing of the test-messages at the target nodes thereof being sent back to the senders of the test-messages, the measurements relating to a network performance characteristic in respect of the paths taken by the test-messages and response-messages, and being dependent also on the local processing of the test-messages at the respective target nodes; comparing the measurements, assigning a weighting in respect of at least one of the nodes dependent on the comparison; and determining a network
(Continued)

A Network Node and Two Neighbouring Nodes performance analysis measure according to a function dependent on at least one of the probe measurements and on the weighting.

14 Claims, 9 Drawing Sheets

(56) References Cited

U.S. PATENT DOCUMENTS

| | | | |
|---|---|---|---|
| 8,880,724 | B2 | 11/2014 | Shah et al. |
| 9,059,904 | B2 | 6/2015 | Cao et al. |
| 9,692,679 | B2* | 6/2017 | Shah ............... H04L 41/0668 |
| 10,129,128 | B2 | 11/2018 | Burbridge et al. |
| 2004/0193709 | A1 | 9/2004 | Selvaggi et al. |
| 2006/0215577 | A1 | 9/2006 | Guichard et al. |
| 2007/0242616 | A1 | 10/2007 | Chang et al. |
| 2007/0270984 | A1 | 11/2007 | Lobig et al. |
| 2007/0274227 | A1 | 11/2007 | Rauscher et al. |
| 2009/0190482 | A1* | 7/2009 | Blair ............... H04L 43/0858 370/250 |
| 2009/0198832 | A1 | 8/2009 | Shah et al. |
| 2010/0103822 | A1 | 4/2010 | Montwill |
| 2010/0315958 | A1 | 12/2010 | Luo et al. |
| 2012/0163191 | A1 | 6/2012 | Tokimizu et al. |
| 2012/0311132 | A1* | 12/2012 | Tychon ............... H04L 41/5038 709/224 |
| 2013/0086250 | A1 | 4/2013 | Eskicioglu et al. |
| 2013/0100824 | A1 | 4/2013 | Cao et al. |
| 2013/0329584 | A1 | 12/2013 | Ghose et al. |
| 2014/0220998 | A1 | 8/2014 | Kovacs et al. |
| 2014/0254573 | A1 | 9/2014 | Ayadurai |
| 2015/0036478 | A1 | 2/2015 | Shah et al. |
| 2015/0100680 | A1 | 4/2015 | Djuric |
| 2015/0333997 | A1* | 11/2015 | Mermoud ............... H04L 43/12 370/252 |
| 2017/0324627 | A1 | 11/2017 | Eardley |
| 2018/0270135 | A1 | 9/2018 | Burbridge et al. |
| 2018/0270141 | A1 | 9/2018 | Burbridge et al. |

FOREIGN PATENT DOCUMENTS

| | | |
|---|---|---|
| CN | 101958810 | 1/2011 |
| CN | 102150395 | 8/2011 |
| CN | 103401726 | 11/2013 |
| EP | 1 206 085 | 5/2002 |
| EP | 2 557 731 | 2/2013 |
| JP | 2008-283621 | 11/2008 |
| JP | 2012-039565 | 2/2012 |
| WO | WO 2014/003889 | 1/2014 |

OTHER PUBLICATIONS

Extended Search Report for EP15188952.4, dated Apr. 18, 2016, (9 pages).
Search Report for GB1517802.3, dated Jun. 28, 2016, (4 pages).
Almes et al., "A Round-trip Delay Metric for IPPM", Network Working Group, vol. ippm, Nov. 1, 1998, XP015020649, (19 pages).
Cisco Systems et al, "Understanding the Ping and Traceroute Commands", Jan. 1, 2010, XP055052448, (22 pages).
Luckie et al: Challenges in Inferring Internet Interdomain Congestion, Proceedings of the 2014Conference on Internet Measurement Conference, IMC '14, Nov. 5-7, 2014, XP055254633, (7 pages).
Clark et al: "Measurement and Analysis of Internet Interconnection and Congestion", Telecommunications Policy Research Conference (TPRC), Sep. 2014 (16 pages).
International Search Report and Written Opinion of the ISA for PCT/EP2016/072883, dated Dec. 5, 2016, (10 pages).
Luckie et al: Challenges in Inferring Internet Interdomain Congestion, Proceedings of the 2014Conference on Internet Measurement Conference, IMC '14, Jan. 1, 2014, XP055254633, (7 pages).
Chinese Search Report dated Jun. 24, 2018, issued in corresponding Chinese Application No. 201680043669.6 (2 pages) and English translation (2 pages).
Chinese Office Action dated Jul. 3, 2018, issued in corresponding Chinese Application No. 201680043669.6 (3 pages) and English translation (4 pages).
Govindan et al. "Estimating Router ICMP Generation Delays", Proceedings of Passive and Active Measurement, PAM 2002, Jan. 1, 2002, XP008136545, (8 pages).
Nakashima, "Experimental analysis of propagation properties implementing the path-based measurement," Proceedings of the 18th International Conference on Advanced Information Networking and Application, AINA 2004, Mar. 29-31, 2004, (6 pages).
Marchetta et al: "Dissecting Round Trip Time on the Slow Path with a Single Packet" Proceedings of the 15th International Conference on Passive and Active Measurement, PAM 2014, Mar. 10-11, 2014, (10 pages).
U.S. Appl. No. 15/761,210, filed Mar. 19, 2018 (27 pgs.).
Office Action dated Sep. 14, 2018 issued in U.S. Appl. No. 15/761,210 (26 pgs.).
Augustin et al, "Multipath Tracing with Paris Traceroute", May 1, 2007 End-to-End Monitoring Techniques and Services, (8 pages), 2007. E2EMON '07, Workshop on, IEEE, XP031183492, http://citeseerx.ist.psu.edu/viewdoc/summary?doi=10.1.1.106.2212.
Crespelle et al: "Rigorous Measurement of IP-level Neighborhood of Internet COre Routers", INFOCOM IEEE Conference on Computer Communications Workshops, Mar. 15-19, 2010, (7 pages) http://ieeexplore.ieee.org/stamp/stamp.jsp?tp=&arnumber=5466707.
U.S. Appl. No. 15/761,237, filed Mar. 19, 2018 (33 pgs.).
Office Action dated Oct. 17, 2018 issued in U.S. Appl. No. 15/761,237 (14 pgs.).
Office Action dated Feb. 8, 2019 issued in U.S. Appl. No. 15/761,237 (16 pgs.).

* cited by examiner

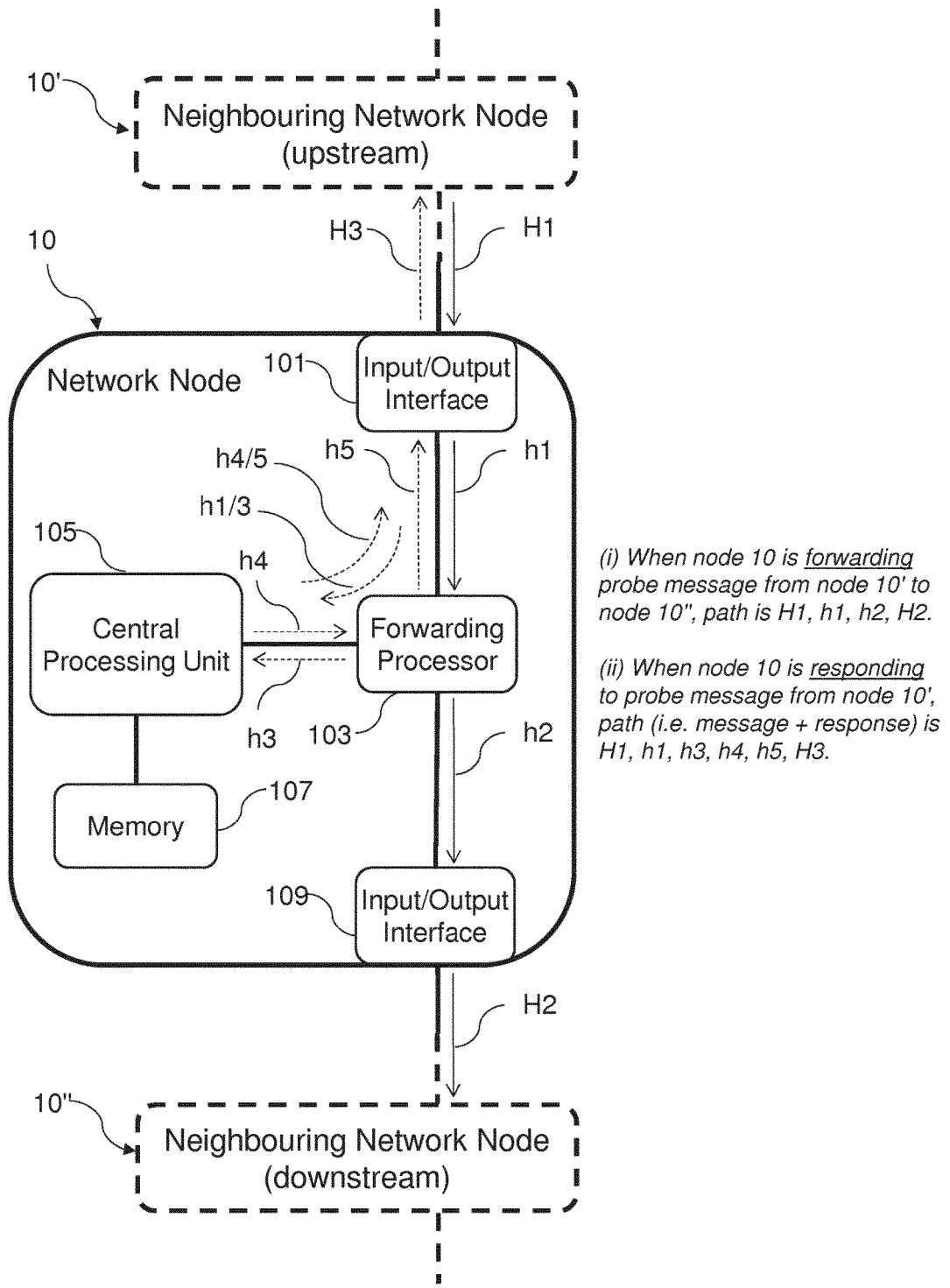
Figure 1: A Network Node and Two Neighbouring Nodes

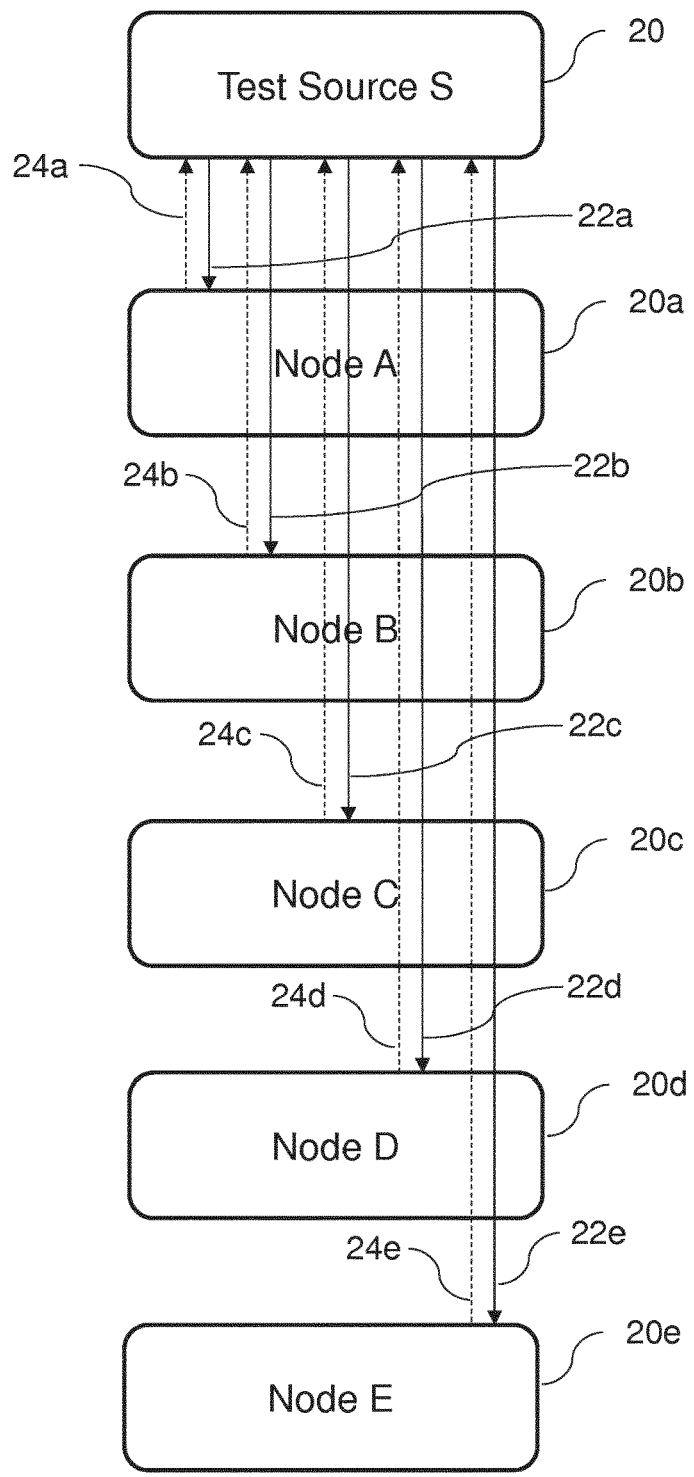
Figure 2 - Probes can be sent to/from each Node along a network path

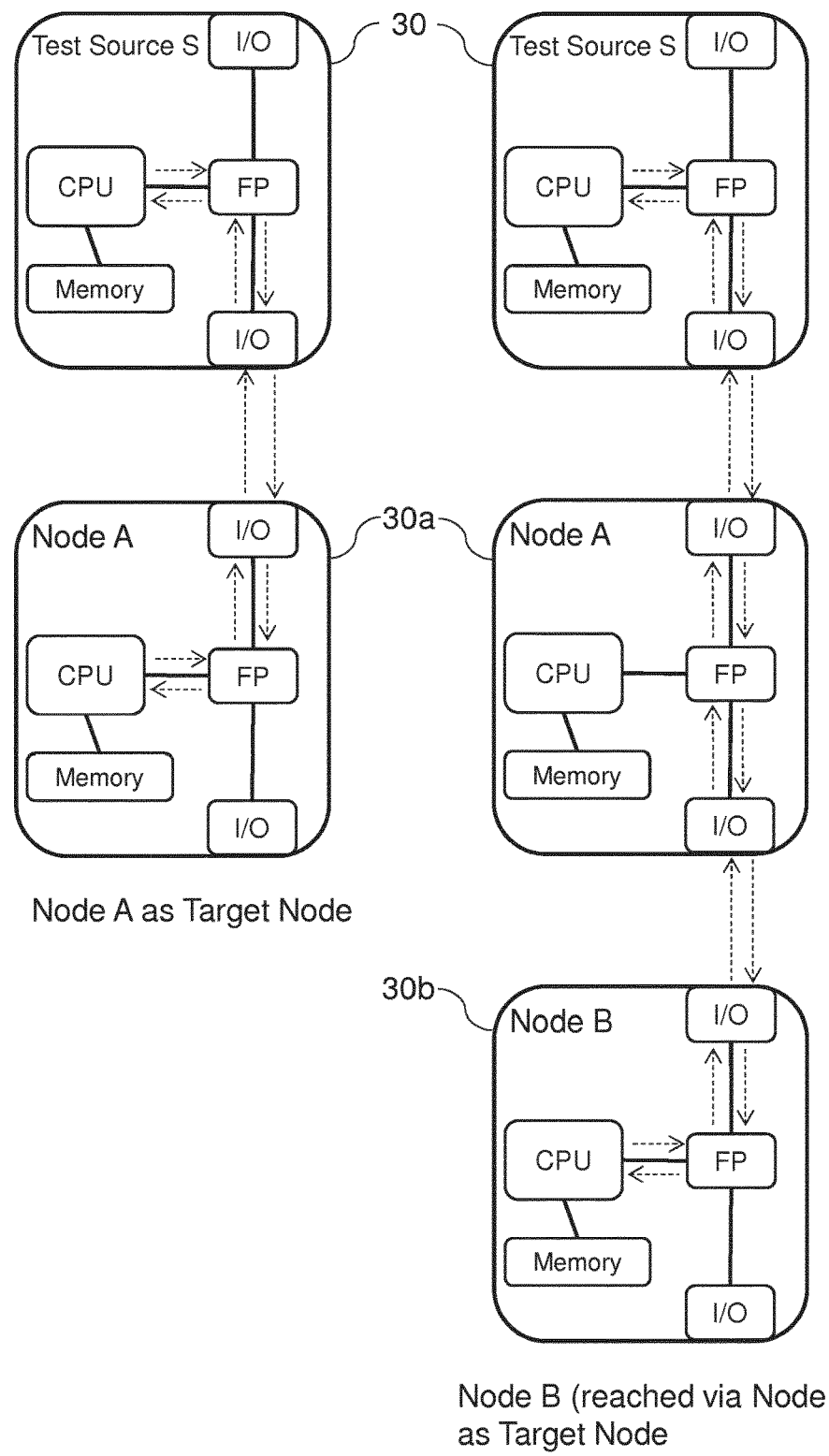
Figure 3 - "Fast-Path" and "Slow-Path" Processing at Different Nodes

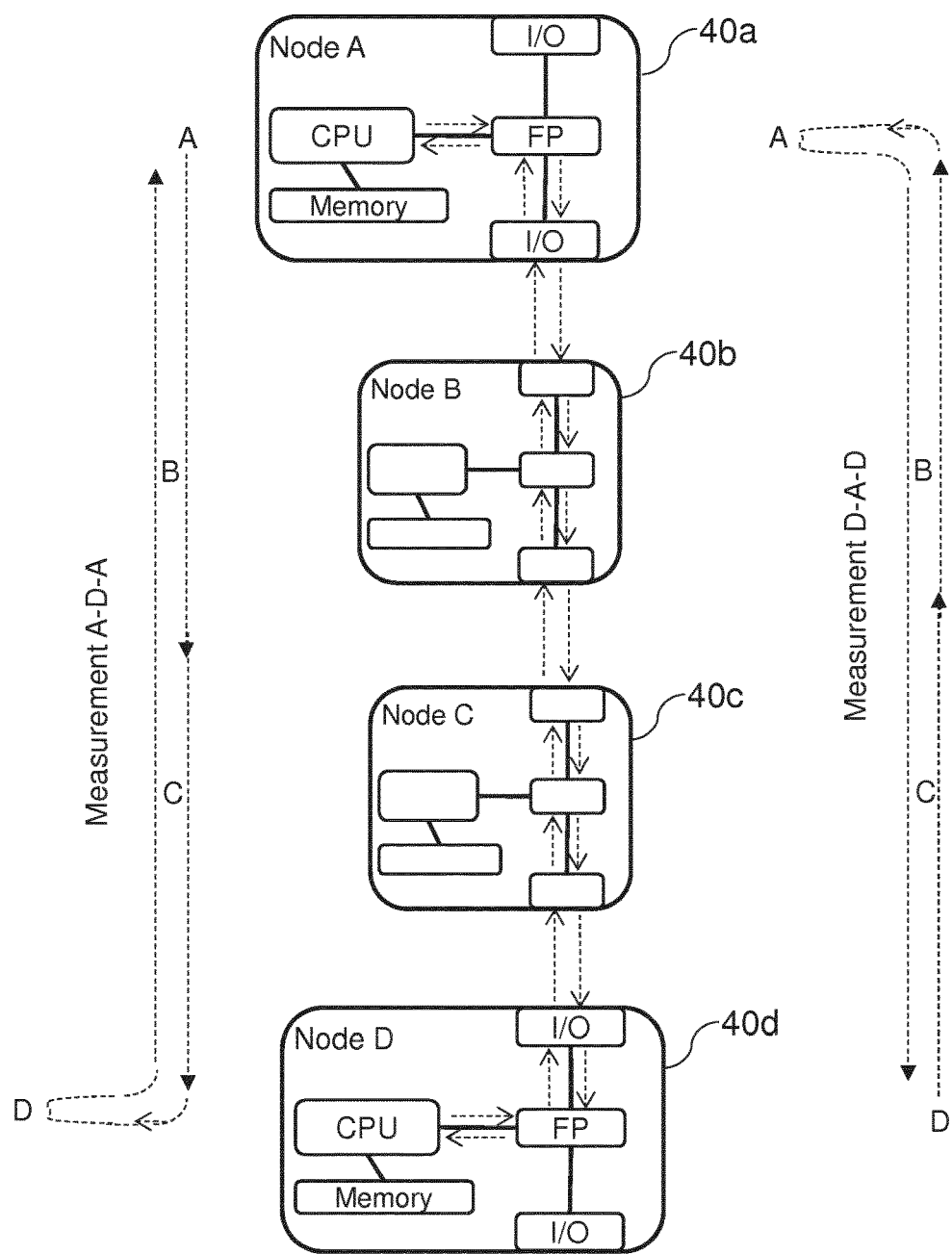
Figure 4: Analysis Using Paths in Both Directions Between Nodes

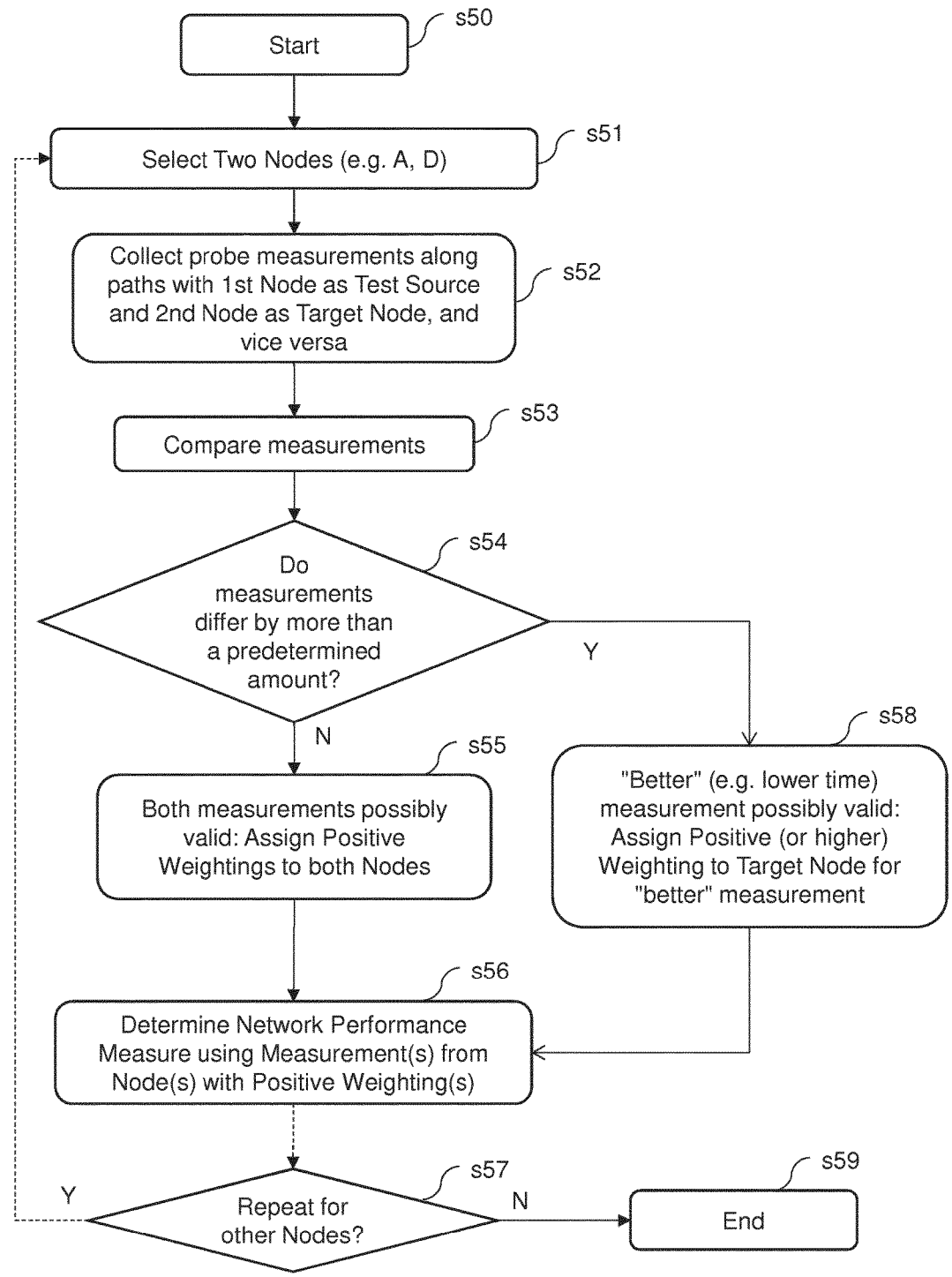
Figure 5: Analysis Using Paths in Different Directions Between Two Nodes

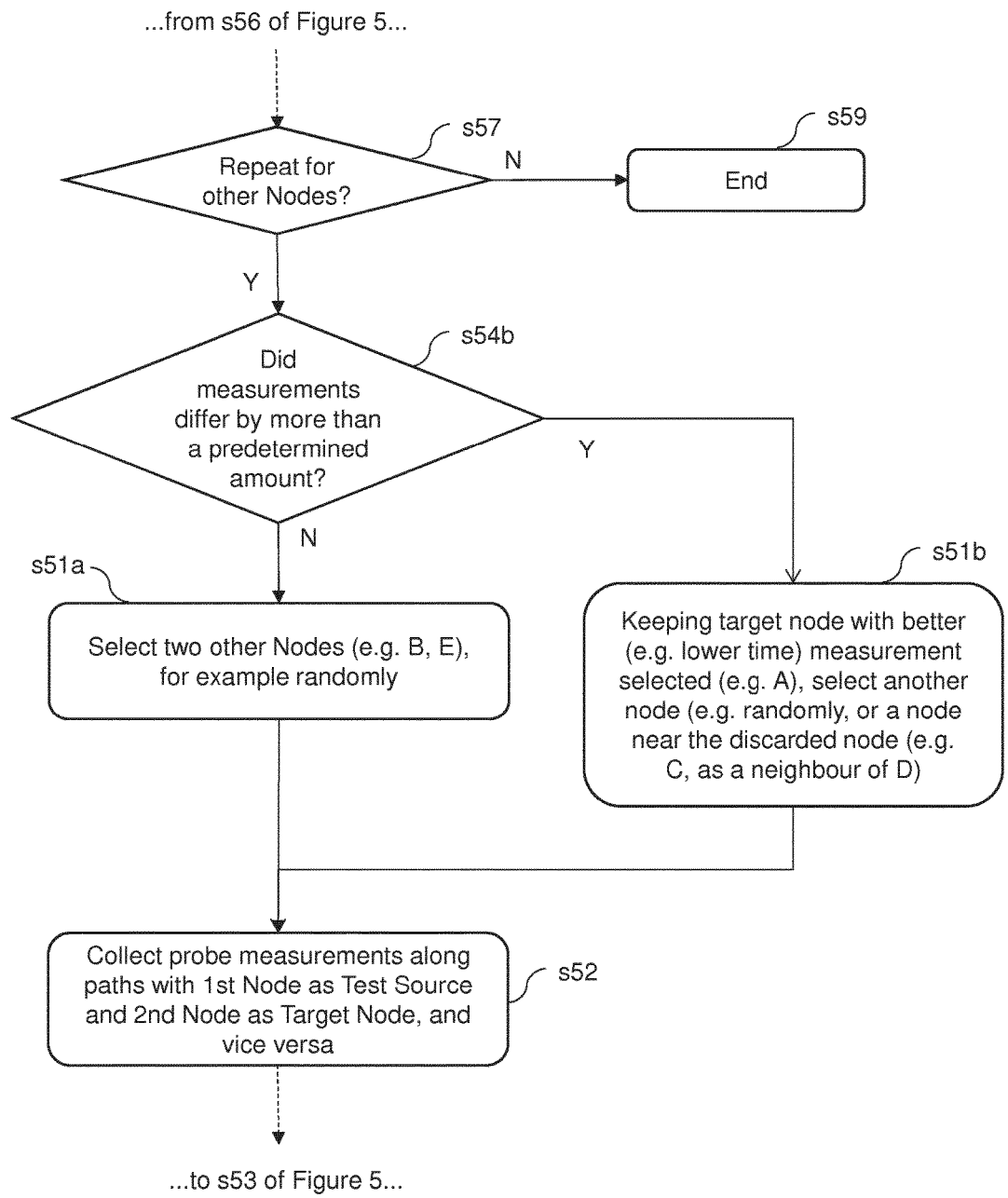
Figure 6: Alternative Process from Step s57 in Figure 5

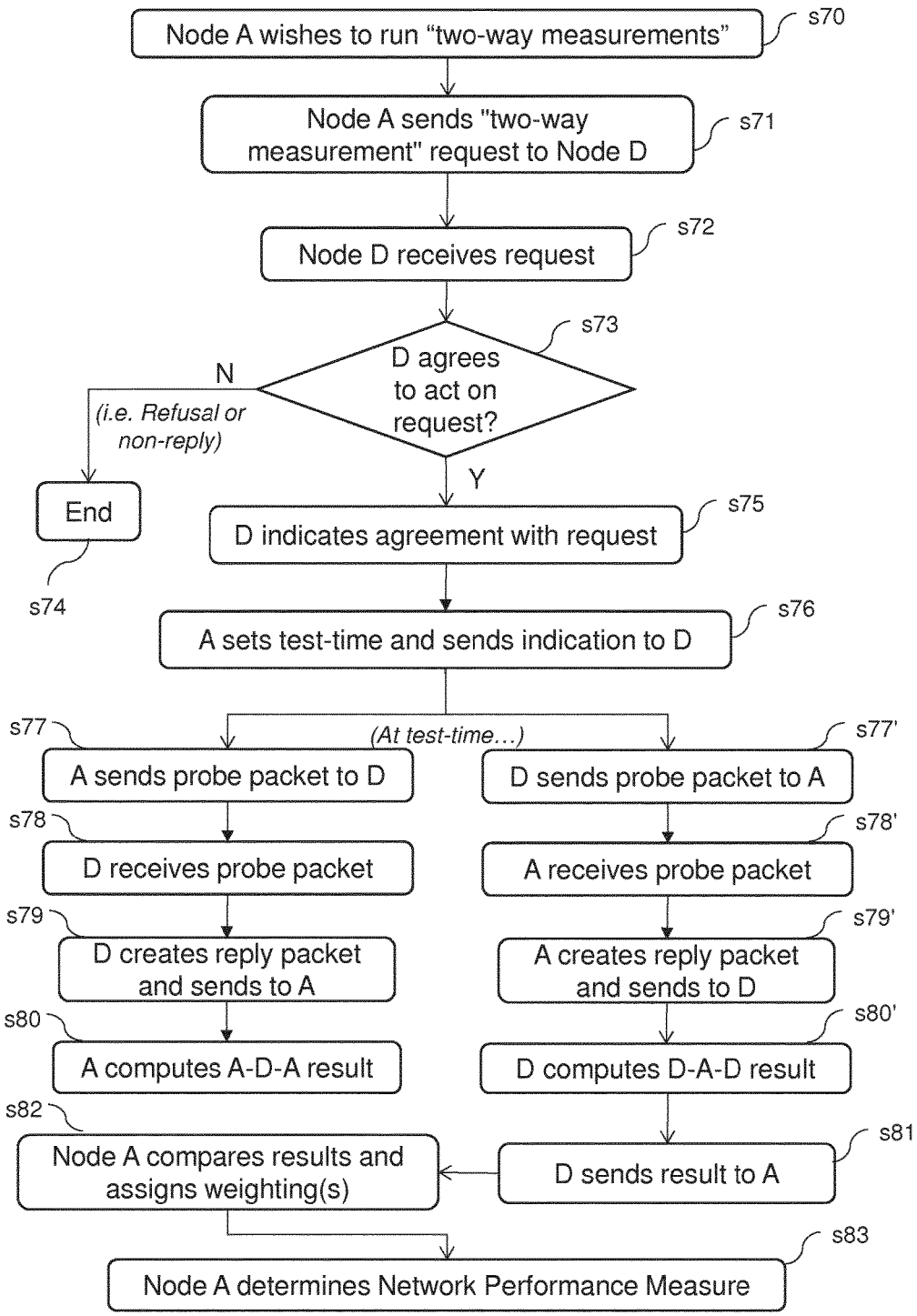
Figure 7: Co-ordination protocol for two-way probes along path between two nodes

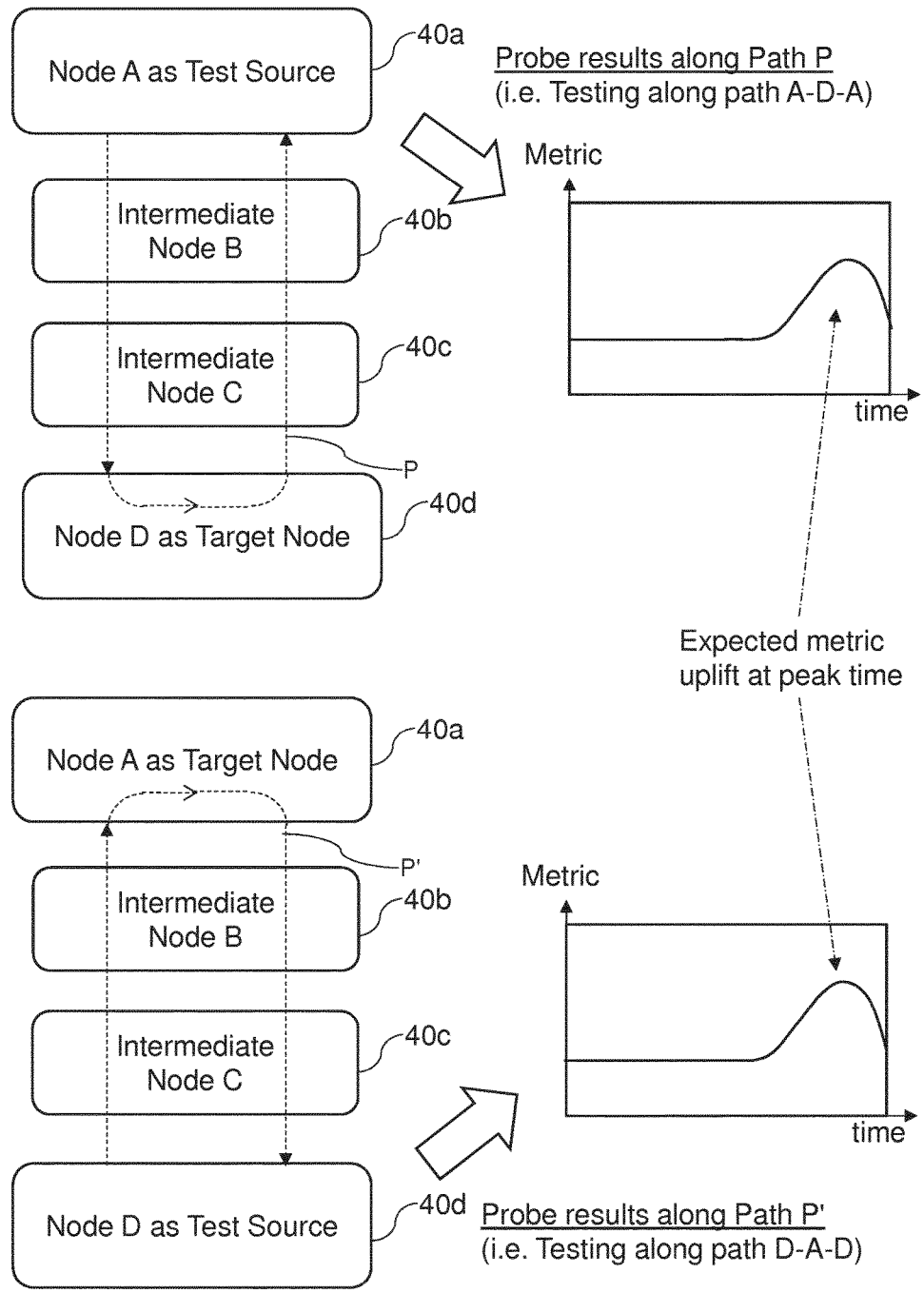
Figure 8: Two-way probes between nodes showing same or similar performance

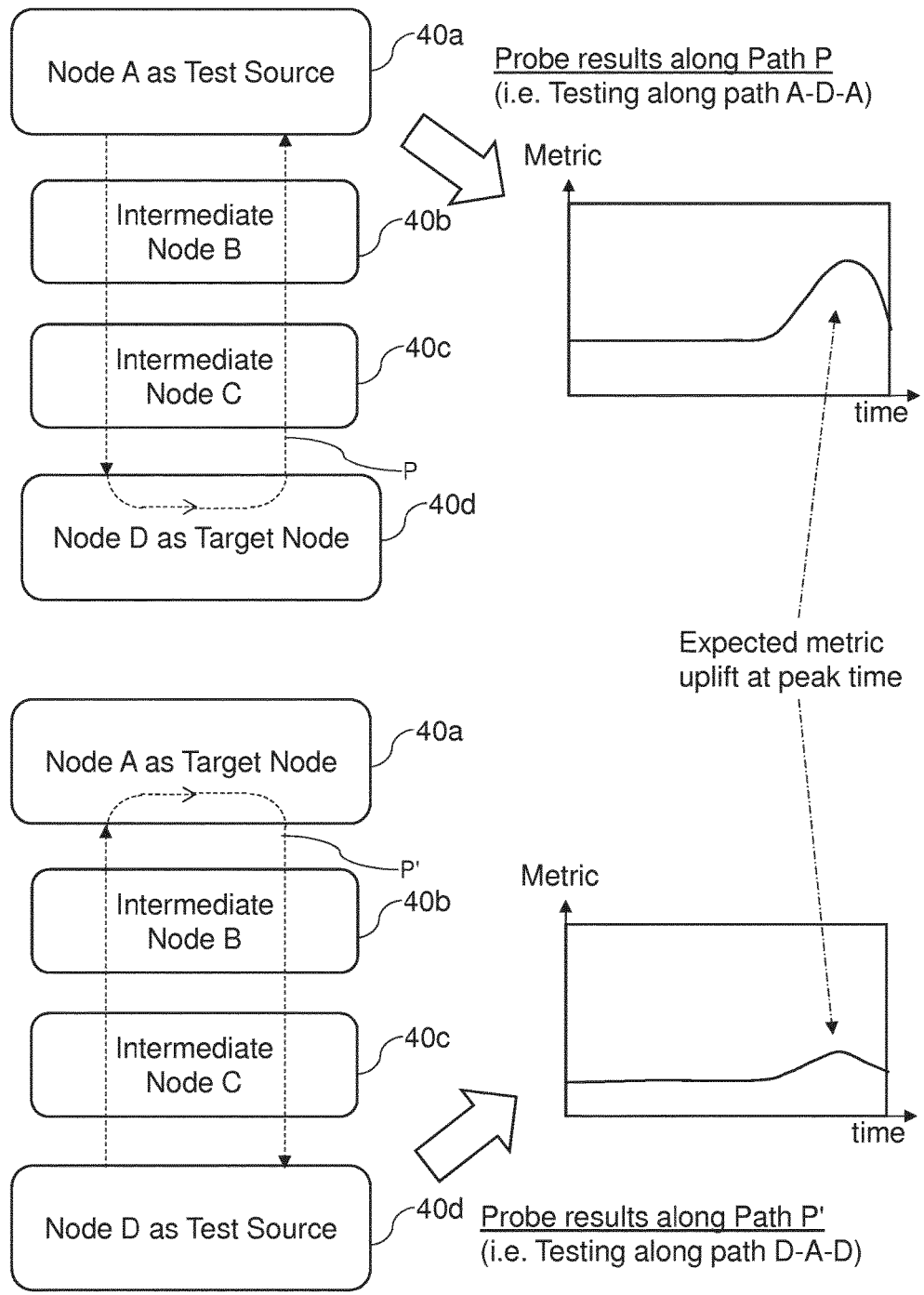
Figure 9: Two-way probes between two nodes showing different performance

ANALYSIS OF NETWORK PERFORMANCE

This application is the U.S. national phase of International Application No. PCT/EP2016/072883 filed 26 Sep. 2016, which designated the U.S. and claims priority to EP 15188952.4 filed 8 Oct. 2015, the entire contents of each of which are hereby incorporated by reference.

TECHNICAL FIELD

The present invention relates to data networks, and to methods and apparatus for analysing performance in respect of data networks. In particular, embodiments thereof relate to ways of analysing or testing network performance in respect of digital data networks such as the Internet, a corporate network, a data centre or a local network using data items such as data packets or other such messages.

BACKGROUND TO THE INVENTION AND PRIOR ART

Analysing networks in order to obtain measurements indicative of network performance can be done using various techniques, including techniques involving active testing (in which traffic is sent over a network specifically for the purpose of conducting tests) and techniques involving passive testing (in which traffic already flowing across a network due to user activity is analysed).

Techniques involving passive testing can show performance of real applications as used by real users, but are generally limited to testing applications and networks being used at a particular time, and can make it hard to compare network performance since the traffic over which tests are being applied varies. Active testing using reference traffic sent across the network does not generally have this disadvantage.

Techniques involving active testing also have problems in what can be tested, however. Typically, active testing techniques either test services themselves (e.g. web page or video performance), or the underlying network. Testing is generally performed from a test-point to a service or to a test-server located in the network. By using multiple test-servers, network operators can get a view of performance across different paths or sub-paths of the network, but it is expensive to deploy and maintain test-servers on a large scale, and this may not give views of networks not under the operator's control unless test-servers are sited within them. There is therefore an interest in using basic network routing equipment to conduct tests, using basic tools such as "traceroute" and "ping".

"Traceroute" is a technique which exploits the feature of Internet Protocol (IP) networks to generate a reply message to the sender of a message when a Time-To-Live (TTL) or hop-limit count expires.

"Ping" is a technique which can be used to test the reachability of nodes in a network, and to measure the round-trip time (RTT) for messages sent from an originating node (such as a computer, server, router, etc.) to a destination node and back. Messages in accordance with the Internet Control Message Protocol (ICMP), referred to as "ICMP probes", "probe messages", or simply "probes", may be sent from a sender acting as a testing-point, generally via one or more intermediate nodes, to a remote network node which, if it is the intended destination of or "target" for the probe (generally indicated in header information included in the probe), sends an associated probe response message back to the sender, allowing the sender to confirm that the target has been reached and allowing the sender to measure the round-trip-time (also known as latency).

In the present context and below, it will be noted that the word "probe" is generally used in the sense of an "investigation" or one or more "investigative messages", rather than a "sensor". The probes concerned may therefore be one or more packets, or one or more of another type of message sent via a network.

Techniques such as the above are commonly used to determine the nodes located along a network path and also to analyse latency or latency variation between pairs of nodes. Overall latency can determine how far away a node is, while the variation in latency, which may be caused by the filling of network queues, can be used as an indication of network congestion. Such techniques can provide a very fine-grained view of network performance at each node of every network path, allowing performance to be viewed by a network operator even in respect of nodes and paths across networks not under the operator's ownership or control.

A problem with such techniques is that results are not always reliable indicators of network performance. While actual network traffic passing through a node is generally handled in an optimised forwarding element of the node ("fast-path" processing), a "traceroute" response or "ping" will generally be handled by the node's general Central Processing Unit (CPU), and generally involves the generation of a new packet or other such message ("slow-path" processing). Traceroute and ping measurements thus often indicate delays and losses that are not actually experienced by forwarded user traffic.

As a result, previous attempts to determine network performance using basic router functions such as traceroute and ping have often been flawed due to the possibly slow or variable handling of these probes (i.e. probe packets or other messages) by standard network equipment such as routers and other nodes, leading to mis-diagnosis of network problems. Many systems have therefore used specialised testing infrastructure (e.g. dedicated test-servers), but as indicated above, these can generally only give overall end-to-end path performance between the test point and wherever these test-servers are located.

There is thus a need for improved ways of testing network performance which are applicable even when using basic probe techniques such as "traceroute" and "ping" in IP networks.

The "Center for Applied Internet Data Analysis" ("CAIDA") has developed a tool called "Scamper" for use in a project referred to as the "Archipelago" project. This is intended to allows bulk traceroute and ping measurements. They have published the following papers:

"Challenges in Inferring Internet Interdomain Congestion" by M. Luckie, A. Dhamdhere, D. Clark, B. Huffaker, & K. Claffy, Internet Measurement Conference (IMC), November 2014, pages 15-22, which is available online at: https://www.caida.org/publications/papers/2014/challenges inferring interdomain congestion/and "Measurement and Analysis of Internet Interconnection and Congestion" by D. Clark, S. Bauer, K. Claffy, A. Dhamdhere, B. Huffaker, W. Lehr, & M. Luckie, Telecommunications Policy Research Conference (TPRC), September 2014, which is available online at: https://www.caida.org/publications/papers/2014/measurement analysis internet interconnection/These papers consider how data can be used to infer congestion, particularly between network domains, and discuss how to analyse the data to detect network problems.

Referring to other prior art citations, US2007270984 ("Lobig") relates to methods and devices for redundancy control of electrical devices. In particular it aims to provide a solution by virtue of the fact that each of the electrical devices is monitored by an additional electrical device and that each of these devices may, in turn, monitor at least one of the electrical devices.

US2004193709 ("Selvaggi") relates to methods, systems and computer program products for evaluating network performance using diagnostic rules. In one method, a path of a communication connection between a first node and a second node is determined, the path including at least one connecting node. A first set of network performance data associated with the communication connection is obtained. One of a plurality of diagnostic rules is automatically evaluated based on the obtained first set of network performance data to identify a second set of network performance data to be collected.

EP1206085 ("Infonet") relates to methods and apparatus for automated service level agreements.

An IETF Network Working Group Internet Draft entitled "A Round-trip Delay Metric for IPPM" dated November 1998 and authored by G. Almes, S. Kalidindi and M. Zekauskas defines a metric for round-trip delay of packets across Internet paths.

A "Tech Notes" publication from Cisco Systems entitled "Understanding the Ping and Traceroute Commands" (http://www.cisco.com/image/gif/paws/12778/ping_traceroute.pdf) dated January 2010 illustrates the use of the ping and traceroute commands and, with the aid of some debug commands, captures a more detailed view of how these commands work.

US2010/315958 ("Luo et al") relates to methods and apparatus for measuring network path quality in a non-cooperative manner, and involves sending a probe consisting of probe data packets to a remote node and receiving a response consisting of at least one response data packet therefrom.

SUMMARY OF THE INVENTION

The CAIDA papers discussed above discuss how to analyse data to detect network problems, but do not consider problems associated with specific nodes themselves having poor or variable response to network probes, let alone methods to deal with such problems.

Embodiments of the invention are based on the realisation that measurements made from sending a probe message such as a "Ping" message from a "testing" network node to a "target" network node, which are supposed to be indicative (at least primarily) of the performance of the network in respect of the path between the respective nodes, may also be influenced unduly by the time taken by the target node itself to perform local, on-board, "slow-path" processing of the probe message. Such "slow-path" processing generally only occurs in respect of probe messages where a node is the "target" node—if the same node is merely an intermediate node forwarding a probe message to a subsequent node which is the target node, it will generally only perform "fast-path" processing in respect of that probe message (i.e. to inspect its header and forward it). The present inventors have realised that this provides an opportunity to isolate and estimate the effect of a particular node's "slow-path" processing, and if it is estimated to be having a particularly damaging effect on the reliability of measurements where it is the target node, network performance analysis can be based (at least primarily) on other nodes whose own effect on probe measurements is less damaging.

According to a first aspect of the invention, there is provided a method of analysing network performance of a network comprising a plurality of network nodes, the method comprising:
  obtaining a plurality of probe measurements, the probe measurements including:
    at least a first probe measurement resulting from one or more probe test-messages being sent from a first node and having a second node as a target node thereof, said probe test-messages being sent via a network path to said second node and one or more associated probe response-messages triggered by receipt and local processing at said second node of the one or more probe test-messages being received via a network path from the second node by the first node; and
    at least a second probe measurement resulting from one or more probe test-messages being sent from the second node and having the first node as a target node thereof, said probe test-messages being sent via a network path to said first node and one or more associated probe response-messages triggered by receipt and local processing at said first node of the one or more probe test-messages being received via a network path from the first node by the second node;
  the respective probe measurements each relating to one or more network performance characteristics in respect of the network paths taken by the respective probe test-messages and the probe response-messages associated therewith and being dependent also on the local processing of the respective probe test-messages at the respective target nodes;
    comparing at least one first probe measurement with at least one second probe measurement, and in dependence on the comparison, assigning a weighting in respect of at least one of said first and second nodes;
    determining a network performance analysis measure according to a predetermined function dependent on at least one of said probe measurements and in dependence on the weighting assigned in respect of said at least one node.

Preferred embodiments may be used to identify whether a particular node, when acting as the target node in respect of a probe, is likely to be providing unreliable results by comparing the result(s) obtained when another node sends one or more probes to it with the result(s) obtained when it sends one or more corresponding probes in the opposite direction, i.e. to the other node. If it is found that results in respect of the paths in opposite directions between the same two nodes differ by a significant amount (e.g. if the results in respect of one direction indicate a significantly higher round-trip time than those results in respect of the other direction, for example), this can be taken as a suggestion or strong indication that the results in respect of the direction with the higher round-trip time are being unduly influenced by "slow-path" processing issues on the node acting as the target node for probes in that direction, rather than (merely) issues on the path(s) between the two nodes, suggesting that those results are unreliable, and should be discounted or given lower weight when analysing network performance The predetermined function may be chosen such that the overall performance analysis measure may be based on or most strongly based on probe measurement(s) obtained by sending probe test-messages targeted at the node from which the "better" (e.g. lower time) measurement(s) was (were) obtained, or on one or more probe measurements subsequently obtained in respect of that node. It will be understood that the meaning of the term "best" will depend on the type of measurement being made, but in general, in relation to some types of measurements such as "time" and "variability" measurements, the lowest will generally be deemed the best, whereas in relation to others, e.g. reliability or data volume measurements, the highest will generally be deemed the best.

The "return" network path taken by a probe response-message of a particular probe attempt will usually be the reverse of the "outward" network path taken by the associated probe test-message, but this will not necessarily be the case, and may not be a factor under the control of entities in control of the testing node or the target node in question.

According to preferred embodiments, equal (or substantially equal) weightings may assigned in respect of the first and second nodes in the event that the comparison indicates that the first and second probe measurements differ by less than a predetermined amount. Correspondingly, different weightings may be assigned in respect of the first and second nodes in the event that the comparison indicates that the first and second probe measurements differ by more than a predetermined amount.

According to preferred embodiments, respective weightings may be assigned in respect of the first and second nodes such that the network performance analysis measure is dependent on one or more probe measurements in respect of each of said first and second nodes. Correspondingly, respective weightings are assigned in respect of the first and second nodes such that the network performance analysis measure is independent of one or more probe measurements in respect of one of said first and second nodes.

It will be understood that the weightings may be "1" (i.e. full, or 100%) and "0" (i.e. zero, or 0%), in order either to include or exclude measurements in respect of a particular node in the overall analysis measure, or may be on a scale from 1 to 0 (i.e. full to zero, or 100% to 0%) in order to allow the overall analysis measure to be influenced to a greater/lesser extent by measurements made in respect of nodes deemed to be providing more/less reliable individual measurements.

According to preferred embodiments, one or more of said probe measurements may result from a plurality of probe test-messages being sent at different times from one of said first and second nodes to the other of said first and second nodes.

According to preferred embodiments, the probe measurements obtained in respect of the respective target nodes may include measurements in respect of one or more of the following:
  one or more characteristics associated with response time (e.g. round-trip response time to a "ping" message);
  one or more characteristics associated with communication speed;
  one or more characteristics associated with communication delay and/or delay variation;
  one or more characteristics associated with communication volume;
  one or more characteristics associated with reliability;
  one or more characteristics associated with data loss;
  one or more characteristics associated with communications quality;
  one or more characteristics associated with security;
  one or more characteristics associated with service usage;
or one or more other types of characteristic.

According to preferred embodiments, the method may further comprise a step whereby each of said first and second nodes receives a request from a control entity, the request leading to each of the first and second nodes sending one or more probe test-messages to the other of the first and second nodes.

According to preferred embodiments, the method may further comprise a step whereby each of said first and second nodes provides one or more probe measurements to a control entity whereby to enable the comparing of probe measurements to be performed.

According to preferred embodiments, the method may further comprise a step whereby one of said first and second nodes sends a request to the other of the first and second nodes, the request leading to the other of the first and second nodes sending one or more probe test-messages to the requesting node.

According to preferred embodiments, the method may further comprise a step whereby one of said first and second nodes obtains one or more probe measurements from the other of the first and second nodes whereby to enable the comparing of probe measurements to be performed.

According to preferred embodiments, at least one of the network nodes may be configured to respond to receipt of one or more probe test-messages from another of the network nodes by sending one or more probe test-messages to the network node from which the one or more probe test-messages have been received.

It will be understood that the method may thus be initiated and/or controlled by one of the nodes involved, or by a separate control entity, for example. In either scenario, the nodes may synchronise the sending of their probe test-messages to each other. The measurements may be collected, compared, and/or otherwise analysed at one or other of the nodes involved or at a separate control entity, and the determination of the overall performance analysis measure may be performed at one or other of the nodes or at a separate control entity.

According to a second aspect of the invention, there is provided apparatus configured to perform a method in accordance with the first aspect.

The apparatus may comprise one or more network nodes such as routers, or one or more processors associated with one or more such nodes, for example.

According to a third aspect of the invention, there is provided a computer program element comprising computer program code to, when loaded into a computer system and executed thereon, cause the computer to perform the steps of a method according to the first aspect.

The various options and preferred embodiments referred to above in relation to the first aspect are also applicable in relation to the other aspects.

Preferred embodiments of the invention are able to utilise existing tests based upon existing functionality found in IP routers. Traceroute and ping are available as client tools along with more comprehensive tools such as scamper that allow bulk automation of traceroute and ping tests. Traceroute exploits the feature of IP networks to generate a reply to the sender when a Time-To-Live (TTL) expires. Ping reflects special ICMP probes to a network node back to the sender in order to test the round-trip-time (also known as latency).

Preferred embodiments of the invention are able to use such tools to produce individual test results for routers along a path from the test point. Such test results may record the time at which the test was executed, the IP node being tested, and performance data such as whether a response was returned along with the delay (or round-trip time) taken to respond.

These individual results may then be used to perform an analysis of the performance in respect of each of a number of nodes. The performance considered is commonly the overall (average) latency to reach the node as well as variation in the latency which might indicate congestion. The techniques developed by CAIDA discussed above can be used to look for diurnal variation in the latency which would be expected from peak-time network usage, however such diurnal variations can also exist in a node's response to traceroute and ping even when the network is not congested.

BRIEF DESCRIPTION OF THE DRAWINGS

Preferred embodiments of the present invention will be described with reference to the appended drawings, in which:

FIG. 1 shows a network node and two neighbouring nodes;

FIG. 2 shows several network nodes on a path;

FIG. 3 illustrates "fast-path" and "slow-path" processing at different nodes;

FIG. 4 illustrates the nodes and paths that may allow analysis using probe messages sent along paths in different directions between the same two nodes in a method according to a preferred embodiment;

FIG. 5 is a flow-chart illustrating how network performance analysis may be performed using probes sent in both directions along between two nodes;

FIG. 6 is a flow-chart illustrating an alternative to part of the process of FIG. 5;

FIG. 7 is a flow-chart illustrating a possible co-ordination protocol which may be used in relation to preferred embodiments;

FIG. 8 illustrates possible results obtained from probes sent along paths in different directions between two nodes performing similarly; and FIG. 9 illustrates possible results obtained from probes sent along paths in different directions between two nodes performing differently.

DESCRIPTION OF PREFERRED EMBODIMENTS OF THE INVENTION

With reference to the accompanying figures, methods and apparatus according to preferred embodiments will be described.

Before describing preferred embodiments of the invention, the issue of "slow-path" and "fast-path" processing in network nodes such as routers, referred to briefly above, will be explained in more detail with reference to FIGS. 1, 2 and 3.

Referring to FIG. 1, this shows a Network Node 10 and two Neighbouring Nodes 10' and 10", which are referred to respectively as being an "upstream" Node 10' and a "downstream" Node 10". Network Node 10 is shown expanded and in detail, with individual/internal functional modules shown (noting that these may be implemented as software or hardware modules, and noting that the separation between them may in fact be functional, rather than spatial), in order to assist with an explanation of the main functions thereof. The two neighbouring nodes 10' and 10" would generally have similar or corresponding individual/internal functional modules, but these are not shown in order to avoid unnecessarily complicating the figure.

It will be understood that the terms "upstream" and "downstream" are comparative, and depend on the role a particular node is playing in relation to a particular exchange of data—a first node can be upstream of a second node in relation to the path taken by one packet and downstream of the second node in relation to the path taken by another packet—but for the present discussion, these terms are used in relation to scenarios where:

(i) upstream node 10' is sending data (e.g. one or more probe messages, comprising one or more data packets) along a path via node 10 to "downstream" network node 10", in which case the function of node 10 is to receive data from upstream node 10' and forward it on to downstream node 10"; and (ii) upstream node 10' is sending data to node 10 itself and receiving a response therefrom.

In FIG. 1, the solid arrows (H1, h1, h2, H2) relate to scenario (i), and indicate the one-way path taken by data sent from upstream node 10' having downstream node 10" as its (intended) destination address (as indicated in its header or otherwise), that reaches and is forwarded by node 10 on its path from upstream node 10' to downstream node 10". Of these arrows, those with a capital "H" (i.e. H1 and H2) indicate external hops on the path, i.e. the hop H1 between nodes 10' and 10, and the hop H2 between nodes 10 and 10". Those with a lower-case "h" (i.e. h1 and h2) indicate internal processing paths within node 10 for data received from node 10' by a first input/output (I/O) interface 101 of node 10 and passed to the forwarding processor 103 of node 10 (h1), then passed from the forwarding processor 103 of node 10 (h2) to a second I/O interface 109 of node 10 which presents the data for forwarding from node 10 on to node 10".

As indicated above, data packets in an IP network generally indicate their destination IP address (as well as their source address and other information) in their IP header, which would generally be used in relation to a "ping" test. For a traceroute request, the header may (also) indicate the Time-To-Live (TTL) hop count, but in this scenario, the target IP address might not be the same as the traceroute destination/target.

The dotted arrows (h3, h4, h5 and H3, and ignoring h1/3 and h4/5 for the time being) relate to scenario (ii), and together with solid arrows H1 and H3 indicate the two-way path taken when data is sent from upstream node 10' having node 10 as its (intended) destination address, when that data reaches node 10 and is processed there, and when an associated response is sent by node 10 back to upstream node 10'. Again, arrows with a capital "H" (i.e. H1 and H3) indicate external hops on the path, i.e. the hop H1 between nodes 10' and 10 (also performed in scenario (i)), and the hop H3 back from node 10 to node 10'. Those arrows with a lower-case "h" (i.e. h1, h3, h4 and h5) indicate internal processing paths within node 10 for data received from node 10' by I/O interface 101 of node 10 and passed to the forwarding processor 103 of node 10 (h1, common to scenario (i)), which is found by node 10 to be targeted at node 10 itself, and which is therefore passed for processing by the CPU 105 of node 10 (h3), processed there, passed back to the forwarding processor 103 of node 10 (h4), passed from there back to I/O interface 101 of node 10 (h5) and presented for forwarding from node 10 back to node 10' (H3). The CPU 105 is shown as having an associated memory 107, in which it may store information such as routing tables, the IP addresses of the interfaces, etc.

Thus, in relation to scenario (i), if node 10 is serving as an intermediate node between an upstream node 10' and a downstream node 10", and is therefore required merely to forward data such as a probe message from node 10' on to node 10", the path taken by the data is:

$H1 \rightarrow h1 \rightarrow h2 \rightarrow H2$

In relation to scenario (ii), however, if node 10 is serving as the target or destination node for data such as a probe message sent to it from upstream node 10', and is therefore requested to send a probe response to the upstream node 10' (so is therefore required to process the probe message in its CPU 105 before sending a response message back to node 10', the path taken by the data is:

$H1 \rightarrow h1 \rightarrow h3 \rightarrow h4 \rightarrow h5 \rightarrow H3$ (NB In relation to the presently-described embodiment as described above, the I/O interfaces 101 and 109 of Node 10 serve simply as interfaces whose function is to forward data received from an external node (e.g. Node 10' or Node 10") to the forwarding processor 103, and to forward data received from the forwarding processor 103 to an external node (e.g. Node 10" or 10'). It is the forwarding processor 103 whose function it is to inspect received data and, in the case of most data packets, including messages such as "ping" requests, determine (e.g. from reading a "destination address" indication in a header of a packet or other such message) whether the node itself is the intended destination for the data (in which case the data is passed to the CPU 105) or whether another node is the intended destination for the data (in which case the data is passed to the appropriate I/O interface for forwarding). (For "traceroute" tests, the issue may be whether a packet's header indicates an expired TTL, rather than whether the packet has reached its intended destination, however.) In any case, it will be noted however that curved dotted arrows referred to as "h1/3" and "h4/5" are shown in FIG. 1. These illustrate the situation in relation to alternative embodiments, in which the function of inspecting received data and determining whether the node itself is the intended destination for the data or whether another node is the intended destination for the data may be performed by the I/O interface receiving the data. In such embodiments, data requiring processing by the CPU 105 may be passed to it internally from the I/O interface 101 along the internal processing path indicated by curved dotted arrow h1/3, without passing through forwarding processor 103, and response data may be passed internally from the CPU 105 back along the path indicated by curved dotted arrow h4/5 to the I/O interface 101, again without passing through forwarding processor 103. The issue of "fast-path" and "slow-path" processing discussed above and below is applicable in relation to both types of embodiment.)

An important issue to note in relation to the above is that when forwarding a probe (such as a "traceroute" or "ping" message), a normal node (as opposed to a dedicated test-server) typically handles this in the same fashion as it handles other packets (NB it is said to be processed on the "fast path", where the word 'path' here refers to an 'internal processing path within the node', rather than to a network path); the node is optimised for forwarding packets and the operation may be carried out entirely in hardware. However, when such a node responds to a probe (for instance, because the TTL of a traceroute packet has reached zero, or because the node is the target or intended destination of a "ping" packet), then the node is said to process the packet on the "slow path" (the word 'path' again referring to an 'internal processing path within the node'); the "response" operation involves the node's CPU, and generally includes generation of a new packet/message which is sent back towards the source of the probe.

As a result of this, measurements of a characteristic relating to performance along a network path (e.g. round-trip response time or delay, variation in round-trip response time or delay, etc.) desired to be measured using one or more probe messages can be distorted by the "slow-path" processing of the probe message(s) on the probe's "target node" itself due to its internal processing, and in particular due to the speed, congestion-state, reliability or another characteristic of the CPU of the target node itself. If the performance measurement desired is one indicative of the performance state of the path between the testing node and the target node, distortion to such measurements being unduly influenced by the "slow-path" processing of the target node itself being unduly slow is generally undesirable.

It can thus be desirable to identify nodes causing (or deemed likely to be causing) significant distortion to individual probe measurements by virtue of their own "slow-path" processing and/or to identify nodes causing (or deemed likely to be causing) the least or most distortion, and therefore allow overall network analysis to be based at least primarily on probe measurements from one or more nodes found (or deemed likely) to be causing the least distortion, and possibly to allow measurements likely to have been more distorted to be removed or ignored from the overall network analysis.

In the interest of simplifying the explanation of the above issues, FIG. 1 only illustrates situations involving the minimum numbers of nodes necessary, but it will be understood that paths across networks may involve several nodes and hops therebetween, and networks are generally branched, so other routes between nodes may also be possible.

Further, while Node 10 is shown as having two I/O interfaces, a first one (101) for receiving data from and sending data to Node 10', and second one (109) for receiving data from and sending data to Node 10", a node may just have one interface for all sending and receiving, one interface for sending and another for receiving, several interfaces, one for each of a number of neighbouring nodes, or another such arrangement of interfaces.

With reference to FIG. 2, for example, which shows several network nodes on a path, it will be understood that a path across a network may generally have several intermediate nodes between an original sender (e.g. Test Source S, 20) of a message such as a probe message and the target for that data. For example if Node E, 20e, is the target node for a probe message 22e from Test Source S, and data travelling from Test Source S to Node E, is received and forwarded respectively by Nodes A, B, C, and D (20a, 20b, 20c, 20d) before reaching Node E, each of Nodes A, B, C and D acts as an intermediate node in respect of the probe message 22e from Test Source S to Node E, and may also act as an intermediate node in respect of as associated response message 24e from Node E back to Test Source S (although it should be noted that this "return" path may not necessarily be the reverse of the "outward" path). In such a scenario, the messages would be subjected to "fast-path" processing by each of Nodes A, B, C and D, and to "slow-path" processing only by Node E.

It will also be understood that while Test Source S is shown as sending probe messages 22a, 22b, 22c, 22d and 22e to each of Nodes A, B, C, D and E (i.e. each acting as the Target Node in respect of the probe message sent thereto) and receiving associated response messages 24a, 24b, 24c, 24d and 24e therefrom, any of the nodes shown may act as a Test Source and send probe messages to and receive associated response messages from any of the other nodes, at the same time or at different times, which may travel along any path linking the nodes, in either direction. Whether a particular node is involved in a particular probe attempt as a Test Source, as an intermediate node, or as a Target Node will determine whether its role will generally involve sending, forwarding, or receiving and responding to a probe message, which in turn will generally determine whether the particular node will process the probe only via its "fast-path" processing route (in order to send or forward the probe message downstream to another node, or forward a response message back towards the Test Source in question) or (additionally) via its "slow-path" processing route (in order to process the probe message in its own CPU, create a response message, and present this for transmittal back upstream towards the Test Source in question).

FIG. 3 illustrates how "fast-path" and "slow-path" processing may be performed at different nodes depending on whether the nodes are serving as the Target Node in respect of a particular probe or merely as an Intermediate Node on a path between a Test Source and a Target Node. For simplicity, it simply illustrates two probe messages being sent from a Test Source S, 30, one of which is sent with Node A, 30a as its Target Node, and the other of which is sent with Node B, 30b as its Target Node, along a path on which Node A, 30a is an Intermediate Node. It will be understood that in different embodiments, the respective probe messages may be sent at the same time by Test Source S, 30, or at different times, that multiple messages may be sent to each Target Node, and that other nodes may also be involved as Test Sources, Intermediate Nodes and Target Nodes, at the same or at different times. This simple example will be used in order to explain how comparisons of different probe measurements made (using "ping", "traceroute", or other such probing techniques) may be made and used.

The individual functional modules of the nodes 30, 30a and 30b (i.e. the I/O Interfaces, the Forwarding Processors, the CPUs and their associated memories) are shown in abbreviated form where applicable, but as these have been explained earlier with reference to FIG. 1, they are not individually numbered in FIG. 3 so as not to over-complicate the figure. Dotted arrows have been used in FIG. 3 in order to show the paths concerned (i.e. the external hops between the nodes as well as the internal processing paths within the nodes) which are traversed in respect of the respective probes (i.e. the respective "outward" paths taken by the respective probe test-messages from the Test Source S to the respective Target Nodes, and the respective "return" paths taken by the respective probe response-messages from the respective Target Nodes back to the Test Source S), but again, these are not labelled as it is thought that this would make the figure unnecessarily complex.

With preferred embodiments of the invention, performance measurements obtained from different probe messages being sent on different paths and/or between different Test Sources and/or Target Nodes are compared in such a way as to indicate which measurements have been, or are likely to have been, unduly influenced by unduly slow, unreliable, misleading or otherwise poor "slow-path" processing in the node acting as the Target Node for the probe message in question. The results of such comparisons can be indicative of which node or nodes is/are responding in such a way as to provide genuine or realistic indications of performance on the network path in question.

Referring to the left-hand side of FIG. 3, consider that a probe from Test Source S to Node A involves the following elements being traversed in the course of allowing a single probe measurement to be made:
(i) the "outward" network path from the originating test-point, Test Source S, to Node A (which itself comprises the dotted arrows within Test Source S from its CPU and on to its I/O interface to Node A, and the dotted arrow from the I/O interface of Test Source S to the I/O interface of Node A, but this sub-division is not of importance because the parts are common to the left-hand side and the right-hand side of the figure);
(ii) the ingress interface on Node A from Test Source S;
(iii) the response processing in respect of the probe within Node A (which itself is represented by the dotted arrows within Node A from its I/O interface via its Forwarding Processor to its CPU, and back via its Forwarding Processor to its I/O interface);
(iv) the egress interface on Node A back towards Test Source S; and
(v) the "return" network path to the Test Source S.

Simplifying the terminology, we can say the following:
Overall Node A measurement=Return path from S to A+Probe response of A where the contribution referred to as "Return path from S to A" to the overall Node A measurement includes the following four sub-contributions:
(i) a sub-contribution relating to the "outward" network path from the Test Source S to Node A;
(ii) a sub-contribution relating to the ingress interface on Node A;
(iv) a sub-contribution relating to the egress interface on Node A back towards Test Source S; and
(v) a sub-contribution relating to the "return" network path from Node A to Test Source S.

It will be noted that the only part of the overall measurement not also forming part of the "Return path from S to A" contribution is that relating to (iii) above, i.e. the response processing in respect of the probe within Node A itself.

Now, with reference to the right-hand side of FIG. 3, consider a probe from the same Test Source S to subsequent Node B, 30b, sent via Node A, 30a. This measures the same elements as the probe to Node A except for the "slow-path" response processing in respect of the probe within Node A itself (as the probe to Node B is merely forwarded across Node A, via its "fast path" processing, rather than processed by the CPU of Node A via its "slow path" processing, but in addition, it now also includes the network path between Node A and Node B ("outward" and "return" contributions, as represented by the dotted arrows between Node A and Node B) and the probe response of Node B itself (represented by the dotted arrows within Node B from its I/O interface via its Forwarding Processor to its CPU, and back via its Forwarding Processor to its I/O interface).

Using the same convention as above, the contributions of overall measurements can be regarded as follows:
Overall Node B measurement=Return path from S to B+Probe response of B
Overall Node B measurement=Return path from S to A+Return path between A and B+Probe response of B
Overall Node B measurement=Overall Node A measurement−Probe response of Node
A return path between Node A and Node B+Probe response of Node B
and
Overall Node B measurement−Overall Node A measurement=Return path between Node A and Node B+Probe response of Node B−Probe response of Node A It can be seen from the above that the performance (which may be measured in terms of speed, throughput, reliability, consistency or any of a variety of other types of characteristic) seen when Node B is the Target Node will not always be slower, longer, smaller, larger, or otherwise worse (depending on the type of performance characteristic in question) than that seen when Node A is the Target Node (e.g. if the Node A probe response is unduly slow). However, any network performance of the path to Node A must be included in the performance seen at Node B. Thus, while it may not be possible to isolate clearly or completely the network performance to Node A, it is possible to identify node measurements that strongly appear to be compromised by the probe response time of Node A if, for example, a round-trip time measurement in respect of a probe from Test Source S to Node A has a greater RTT than a concurrent measurement in respect of a probe from the same Test Source S via Node A to subsequent Node B.

With preferred embodiments of the invention, the performance as indicated by one or more measurements made in respect of a first node acting as the "Test Source" and a second node acting as the "Target Node" is compared with the performance as indicated by one or more measurements made in respect of the second node acting as the "Test Source" and the first node acting as the "Target Node". A primary motivation is that if the results obtained are indicative of genuine performance of the network and/or path(s) between the two nodes in question, a comparison will general find them to be similar, whereas if they differ significantly, the disparity is likely to be at least partly due to one of the nodes itself having an undue influence on measurements in relation to which it is acting as the "Target Node".

In particular, where the measurements result from sending "ping" messages or similar, for example, and/or relate to time (e.g. round-trip time, RTT) or time-variation, if the measurements resulting from probe test-messages being sent from the first node to the second node and being processed at the second node, and from associated probe response-messages being sent back to the first node, indicate a greater round-trip time than those resulting from probe test-messages being sent from the second node to the first node and processed at the first node, and from associated probe response-messages being sent back to the second node, this can be taken as a strong indication that the measurements resulting from probe test-messages being sent from the first node to the second node are being unduly-influenced by slow and/or otherwise problematic "slow-path" processing of the probes by the second node (i.e. acting in its role as the "Target Node" for those probe test-messages).

Whether the measurements relate to time, time-variation, or other characteristics, it is likely that the "worse" measurements (e.g. the longer times if the measurements are time measurements) have been overly-influenced by slow/problematic "slow-path" handling of the probe by the node acting as the target node for it, and that the "better" (e.g. lower time) measurements will be more likely to provide an accurate indication of network performance in respect of the path or paths between the nodes, or of the portion of the network concerned.

The following explanation is given in relation to a network including nodes such as those shown in FIG. 4. This illustrates a set of nodes and paths that may allow analysis using probe messages sent along paths in opposite directions between the same two nodes such that the nodes are essentially testing each other.

Four nodes are shown. For simplicity, these are shown as four nodes in series forming a path (i.e. between Node A, 40a and Node D, 40d via two intermediate nodes, Node B, 40b and Node C, 40c), but it will be appreciated that there are paths in both directions, one from Node A to Node D, and another from Node D to Node A. This example will serve to illustrate how tests can be made in both directions. It should be noted however that there may be other nodes (e.g. acting as other intermediate nodes), not necessarily in series with the four shown, and that there may be therefore be other paths between the same two nodes. While a probe test-message and an associated probe response-message sent in response thereto will generally travel along the same path in opposite directions, this is not necessarily the case.

As with FIG. 3 above, FIG. 4 illustrates how "fast-path" and "slow-path" processing may be performed at different nodes depending on whether those nodes are serving as the Target Node in respect of a particular probe or merely as an Intermediate Node on a path between a Test Source and a Target Node.

For simplicity, FIG. 4 illustrates two probe test-messages being sent, a first being sent from Node A (acting as the "Test Source") via Intermediate nodes B and C to Node D (acting as the "Target Node"), and a second being sent from Node D (acting as the "Test Source") via Intermediate nodes C and B to Node A (acting as the "Target Node"). The first probe test-message results in an associated probe response-message being sent from Node D back (via nodes C and B) to Node A. This is signified by the path shown on the left of FIG. 4, and leads to the measurement shown as "Measurement A-D-A" (although it will be appreciated that the path taken is actually "A-B-C-D-C-B-A"), which may therefore be influenced by the "slow-path processing" performance of Node D. The second probe test-message results in an associated probe response-message being sent from Node A back (via nodes B and C) to Node D. This is signified by the path shown on the right of FIG. 4, and leads to the measurement shown as "Measurement D-A-D" (similarly, it will be appreciated that the path taken is "D-C-B-A-B-C-D"), which may therefore be influenced by the "slow-path processing" performance of Node A.

It will be understood that while a probe test-message being sent from a particular node (e.g. Node A) will generally have resulted from processing in the CPU of that node, if the probe test-message is being sent in order to obtain a time measurement (e.g. an RTT measurement), the period measured will generally be the period starting from the time indicated by a time-stamp indicating when the probe test-message is sent from the Test Source (e.g. Node A) and ending at the time indicated by a time-stamp indicating when an associated probe response-message is received at the Test Source from the Target Node (e.g. Node D), the Target Node having received the probe test-message, processed it in its CPU, generated the associated probe response-message, and sent this back towards the Test Source. As a result, such a time measurement will not generally be affected significantly by the current processing state of the CPU of the Test Source, because the time period measured does not include the period in which the probe is being subjected to "slow-path" processing at the Test Source, but is likely to be affected by the current processing state of the CPU of the Target Node, because the time period measured does include the period in which the probe is being subjected to "slow-path" processing at the Target Node.

It will also be appreciated that for a probe sent from Node A to Node D that results in a response from Node D being sent to Node A, the probe test-message from Node A need only be forwarded by intermediate nodes B and C to Node D, and the probe response-message from Node D need only be forwarded by intermediate nodes C and B to Node A, so nodes B and C will generally only be involved in process requiring "fast-path" processing. Similarly, for a probe sent from Node D to Node A that results in a response from Node A being sent to Node D, nodes B and C will generally only be involved in process requiring "fast-path" processing.

It will thus be understood that while the probes each involve one message travelling from Node A to Node D and one message travelling from Node D to Node A, and while each probe (generally) involves messages being forwarded twice (i.e. once in each direction) by each of intermediate nodes B and C, the processing of the probes on their respective round-trip paths in so far as measurements such as "ping" measurements are concerned differs in that one probe (the probe initiated at Node A) requires to "slow-path" processing at Node D but not at Node A during the measurement period concerned, whereas the other probe (the probe initiated at Node D) requires to "slow-path" processing at Node A but not at Node D during the measurement period concerned.

It will be understood that in different embodiments, the respective probe messages may be sent at the same time by Nodes A and D, or at different times, that multiple messages may be sent by each to the other, and that other nodes may also be involved as Test Sources, Intermediate Nodes and Target Nodes, at the same or at different times. This simple example will be used in order to explain how comparisons of probe measurements made in respect of paths in opposite directions between Nodes A and D (using "ping" or other such probing techniques) may be made and used.

The individual functional modules of the nodes A, B, C and D (i.e. the I/O Interfaces, the Forwarding Processors, the CPUs and their associated memories) are shown in abbreviated form where applicable, but as these have been explained earlier with reference to FIG. 1, they are not individually numbered in FIG. 4 so as not to over-complicate the figure. Dotted arrows have been used in FIG. 4 in order to show the paths concerned (i.e. the external hops between the nodes as well as the internal processing paths within the nodes themselves) which are traversed in respect of the respective probes (i.e. the respective "outward" paths taken by the respective probe test-messages from the respective nodes A and D (each in its role as "Test Source") to the other (in its role as "Target Node"), and the respective "return" paths taken by the respective probe response-messages.

With preferred embodiments, performance measurements made/obtained in respect of Node A testing Node D and from Node D testing Node A are compared in order to investigate the performance in respect of the path(s) and/or network portion linking the two. As indicated, the measurements may be ping or traceroute measurements which provide measures of the round-trip response times from the Test Source to the Target Node and back. Each response time includes the time for the probe test and associated response messages to be forwarded across the network, plus any delay due to processing on the Target Node itself to generate the response.

Methods in accordance with a preferred embodiment will now be described with reference to FIGS. 5, 6 and 7.

FIG. 5 is a flow-chart illustrating how network performance analysis may be performed using probes sent in both directions along between two nodes. For this explanation, we will consider measurements of round-trip time (RTT) obtained by "ping" probes, but it will be understood that others characteristics may be measured using other probe techniques.

Starting from step s50, two nodes to be used for analysis are selected (step s51). In this case, nodes A and D from FIG. 4 will be considered.

At step s52, probe measurements are collected in respect of probe test-messages sent along the respective paths in opposite directions between nodes A and D, i.e. a first path with Node A as the Test Source and Node D as the Target Node, and a second path with Node D as the Test Source and Node A as the Target Node. The measurements obtained in respect of the respective directions are compared (step s53).

If it is found (at step s54) that the measurements are the same or similar (i.e. that they differ by less than a predetermined amount), it can be concluded (at step s55) that measurements in respect of both directions are at least possibly valid, as the lack of a significant disparity suggests that neither measurements are being unduly influenced by internal processing issues at the respective Target Nodes (although it will be appreciated that it is possible that they may coincidentally be being equally influenced by such issues), and are therefore likely to be indicative of performance issues on the path(s) between the two nodes in question. In this case, a positive weighting, which may be "1" or a value between "0" and "1", may be assigned to each node, or to the measurements obtained in respects of each node (in each one's role as a Target Node), indicating that such measurements can be used in the overall determination of a network performance measure.

The process then continues to step s56, at which an overall Network Performance Measure can be determined based on measurements already or subsequently obtained between the two nodes (and any others in respect of which a positive weighting has been assigned, for example).

If it is found (at step s54) that the measurements differ by more than a predetermined amount, it can be concluded (at step s58) that measurements made from test-messages being sent to the Target Node that resulted in "better" (e.g. lower time) measurements are more likely to be valid, as the level of disparity suggests that the measurements made from test-messages being sent to the other node (as Target Node) are likely to be being unduly influenced by internal processing issues at that Target Node. A positive weighting, which may be "1" or a value between "0" and "1"—possibly 0.5—may be assigned to the Target Node that resulted in the "better" measurements, or to the measurements obtained in respects of that node, indicating that such measurements can be used in the overall determination of a network performance measure (albeit possibly with less certainty than at s55), and a lower or zero weighting may be assigned to the other Target Node (i.e. the node that resulted in the "worse" measurements), or to the measurements obtained in respects of that node.

The process then continues to step s56, at which an overall Network Performance Measure can be determined based on measurements already or subsequently obtained in respect of either or both of the nodes (and any others in respect of which a positive weighting has been assigned, for example).

If it is desired (at step s57) to continue the analysis in respect of other nodes, the process can return to step s51. If not, the process can end at step s59.

FIG. 6 is a flow-chart illustrating an alternative to part of the process of FIG. 5. If the process of FIG. 5 has been performed up to and including the determination (step s56) of a Network Performance Measure based on probe measurements collected in respect of a selected pair of nodes, and it is desired (at step s57) to continue the analysis in respect of other nodes, the selection of other nodes for analysis can be made in such a way as to improve the level of confidence in the results. If (for example) it was found (at step s54b) that the measurements in respect the previous pair of nodes differed by less than the predetermined amount, allowing a reasonably high confidence level in those results, the process may proceed to step s51a and select two other nodes (e.g. Nodes B and E) at random, for example, then return to step s52 and repeat the process in respect thereof. If, on the other hand, it was found (at step s54b) that the measurements in respect the previous pair of nodes differed by more than the predetermined amount, allowing a lower confidence level even in the "better" of those results (e.g. Node A), the process may proceed to step s51b. Keeping the Target Node (e.g. Node A) in respect of which the "better" (e.g. lower time) measurement as a selected node, a new node can be selected for comparison with the one that is being kept. The selection of the new node may be made randomly, or a node near the discarded node may be chosen (e.g. Node C, as a neighbour of Node D), for example. The process may then return to step s52 and be repeated in respect of the "better" of the two previous Target Nodes and the new node. Another alternative to the above process would be to keep the Target Node in respect of which the "poorer" (e.g. greater time) measurement was obtained as a selected node (e.g. Node D), and select a new node for comparison with that. Again, the selection of the new node may be made randomly, or a node near the discarded node may be chosen (e.g. Node C, as a neighbour of Node D), for example. Similarly, the process may then return to step s52 and be repeated in respect of the "poorer" of the two previous Target Nodes and the new node. The reason for this alternative approach could be to increase confidence that the suspect Target Node (e.g. Node D) does add a high delay due to processing to generate the response, and that therefore a lower, perhaps zero, weighting may be assigned to this node (e.g. Node D).

According to some embodiments, a central control unit may be controlling and instructing nodes as to what probes to send, collecting probe measurements in respect of pairs of nodes and analysing them. In cases where the nodes concerned (e.g. nodes A and D) are not under the control of the same entity (e.g. a network operator), it may be possible for the operator of Node A to get Node A to act as a Test Source and send a probe to Node D, but it may not be so easy for that operator to get Node D to act as a Test Source and send a probe to Node A. In such scenarios, respective operators may have partnership agreements.

Another possibility is that there may be a co-ordination protocol by which a first node can send a request to a second, which may then choose whether or not to act on the request.

FIG. 7 is a flow-chart illustrating a possible co-ordination protocol such as the above, which may be used in relation to preferred embodiments. In this, if Node A (for example) decides (at step s70) to run "two-way measurements" (according to the process of FIG. 5, for example), it may send a "two-way measurement" request to Node D (for example) (step s71). Node D receives the request (step s72). If Node D decides (at step s73) not to act on the request (by active refusal or by not replying, for example), the process may simply end (step s74). If however Node D agrees (at step s73) to act on request, it D indicates its agreement (at step s75), sending a confirmation to Node A, for example. Node A may then set a test-time and send an indication thereof to Node D (step s76) if it is desired for the respective probe messages to be sent at the same time.

At the test-time, Node A sends a probe test-packet to Node D (step s77), while at the same time, Node D sends a probe test-packet to Node A (step s77'). Node D (as the Target Node for the test-packet from Node A) receives the test-packet from Node A (step s78), and (generally) at approximately the same time (i.e. if network conditions are similar in the two directions), Node A (as the Target Node for the test-packet from Node D) receives the test-packet from Node D (step s78'). Each node then creates a probe reply-packet and sends it to the other node (steps s79 and s79'). When the respective nodes receive the respective reply-packets, they can compute their respective results (steps s80 and s80'). Node D can then send the result (measurement "D-A-D") of its probe to Node A (step s81), which is already in possession of the result of its probe sent to Node D (measurement "A-D-A") and is able to compare the two and assign weightings accordingly (step s82). Node A can then determine the overall Network Performance Measure (step s83).

Another alternative process is that nodes under the control of different operators may generally be configured (under a common protocol, for example) to respond to receipt of a probe test-message by sending a corresponding test-message back and reporting the result thereof to the sender, thereby removing any need for a node to send a "two-way measurement" request, or for a test-time to be set.

FIG. 8 illustrates possible results obtained from probes sent along paths in different directions between two nodes performing similarly. For the metric illustrated, the performance varies over time, however at any one moment the measurements in the two directions are similar, because the variation is likely to be due mainly to variation in the performance of the network (which affects both directions of measurement to a similar extent), rather than the respective "slow path" processing performances of the nodes acting respectively as Target Nodes (which would be likely to affect the different directions of measurement to different extents). For example, over the course of a day the network could be "busier" (or more congested) at some times than at others, meaning that it carries more traffic. "Busier" could mean that when a packet arrives at a Node (e.g. at its input interface 101 in FIG. 1) then on average there are more packets already queued in the forwarding processor (103) waiting to be sent on the outgoing interface (109). This difference affects that fast path processing time, which therefore varies over the course of the day (in our example), whilst there is consistently little difference in the slow path processing time of the two target nodes. Note that "at any one moment the measurements in both directions are similar" does not necessarily mean at exactly the same instant, but rather it can mean for example the average of individual measurements made during some time interval.

FIG. 9 illustrates possible results obtained from probes sent along paths in different directions between two nodes performing differently. The example is similar to that described for FIG. 8, except that in this case it is assumed that the measurements in the two directions are consistently (or for significant periods of time, at least) significantly different. This is likely to have arisen because the slow path processing on the two target nodes is significantly different. However, as in FIG. 8, the network may be "busier" at some times of the day (for example) than at others, which will lead to similar variation in the measurements in the two directions, but with a constant "offset" due to the difference in the respective "slow path" processing performances of the nodes acting respectively as Target Nodes.

Insofar as embodiments of the invention described are implementable at least in part using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of analyzing network performance of a network comprising a plurality of network nodes, the method comprising:
   obtaining a plurality of probe measurements, the probe measurements including:
      at least a first probe measurement resulting from one or more probe test-messages being sent from a first node and having a second node as a target node thereof, said probe test-messages being sent via a network path to said second node and one or more associated probe response-messages triggered by receipt and local processing at said second node of the one or more probe test-messages being received via a network path from the second node by the first node; and at least a second probe measurement resulting from one or more probe test-messages being sent from the second node and having the first node as a target node thereof, said probe test-messages being sent via a network path to said first node and one or more associated probe response-messages triggered by receipt and local processing at said first node of the one or more probe test-messages being received via a network path from the first node by the second node;
   the respective probe measurements each relating to one or more network performance characteristics in respect of the network paths taken by the respective probe test-messages and the probe response-messages associated therewith and being dependent also on the local processing of the respective probe test-messages at the respective target nodes;
   comparing at least one first probe measurement with at least one second probe measurement, and in dependence on the comparison, assigning a weighting in respect of at least one of said first and second nodes;
   determining a network performance analysis measure according to a predetermined function dependent on at least one of said probe measurements and in dependence on the weighting assigned in respect of said at least one node.

2. A method according to claim 1 wherein equal weightings are assigned in respect of the first and second nodes in the event that the comparison indicates that the first and second probe measurements differ by less than a predetermined amount.

3. A method according to claim 1 wherein different weightings are assigned in respect of the first and second nodes in the event that the comparison indicates that the first and second probe measurements differ by more than a predetermined amount.

4. A method according to claim 1 wherein respective weightings are assigned in respect of the first and second nodes such that the network performance analysis measure is dependent on one or more probe measurements in respect of each of said first and second nodes.

5. A method according to claim 1 wherein respective weightings are assigned in respect of the first and second nodes such that the network performance analysis measure is independent of one or more probe measurements in respect of one of said first and second nodes.

6. A method according to claim 1 wherein one or more of said probe measurements result from a plurality of probe test-messages being sent at different times from one of said first and second nodes to the other of said first and second nodes.

7. A method according to claim 1 wherein the probe measurements obtained in respect of the respective target nodes include measurements in respect of one or more of the following:
   one or more characteristics associated with response time;
   one or more characteristics associated with communication speed;
   one or more characteristics associated with communication delay and/or delay variation;
   one or more characteristics associated with communication volume;
   one or more characteristics associated with reliability;
   one or more characteristics associated with data loss;
   one or more characteristics associated with communications quality;
   one or more characteristics associated with security;
   one or more characteristics associated with service usage.

8. A method according to claim 1, the method further comprising a step whereby each of said first and second nodes receives a request from a control entity, the request leading to each of the first and second nodes sending one or more probe test-messages to the other of the first and second nodes.

9. A method according to claim 1, the method further comprising a step whereby each of said first and second nodes provides one or more probe measurements to a control entity whereby to enable the comparing of probe measurements to be performed.

10. A method according to claim 1, the method further comprising a step whereby one of said first and second nodes sends a request to the other of the first and second nodes, the request leading to the other of the first and second nodes sending one or more probe test-messages to the requesting node.

11. A method according to claim 1, the method further comprising a step whereby one of said first and second nodes obtains one or more probe measurements from the other of the first and second nodes whereby to enable the comparing of probe measurements to be performed.

12. A method according to claim 1 wherein at least one of the network nodes is configured to respond to receipt of one or more probe test-messages from another of the network nodes by sending one or more probe test-messages to the network node from which the one or more probe test-messages have been received.

13. Apparatus for analyzing network performance of a network comprising a plurality of network nodes, the apparatus comprising a storage medium storing computer code and one or more computer hardware processors for executing the computer code such that the apparatus is at least configured to:
   obtain a plurality of probe measurements, the probe measurements including:
      at least a first probe measurement resulting from one or more probe test-messages being sent from a first node and having a second node as a target node thereof, said probe test-messages being sent via a network path to said second node and one or more associated probe response-messages triggered by receipt and local processing at said second node of the one or more probe test-messages being received via a network path from the second node by the first node; and
      at least a second probe measurement resulting from one or more probe test-messages being sent from the second node and having the first node as a target node thereof, said probe test-messages being sent via a network path to said first node and one or more associated probe response-messages triggered by receipt and local processing at said first node of the one or more probe test-messages being received via a network path from the first node by the second node;
   the respective probe measurements each relating to one or more network performance characteristics in respect of the network paths taken by the respective probe test-messages and the probe response-messages associated therewith and being dependent also on the local processing of the respective probe test-messages at the respective target nodes;
      compare at least one first probe measurement with at least one second probe measurement, and in dependence on the comparison, assign a weighting in respect of at least one of said first and second nodes;
      determine a network performance analysis measure according to a predetermined function dependent on at least one of said probe measurements and in dependence on the weighting assigned in respect of said at least one node.

14. A non-transitory computer-readable storage medium storing computer program code to, when loaded into a computer system and executed thereon, cause the computer to perform analysis of network performance of a network comprising plurality of network nodes, steps of the performed analysis comprising:
   obtaining a plurality of probe measurements, the probe measurements including:
      at least a first probe measurement resulting from one or more probe test-messages being sent from a first node and having a second node as a target node thereof, said probe test-messages being sent via a network path to said second node and one or more associated probe response-messages triggered by receipt and local processing at said second node of the one or more probe test-messages being received via a network path from the second node by the first node; and
      at least a second probe measurement resulting from one or more probe test-messages being sent from the second node and having the first node as a target node thereof, said probe test-messages being sent via a network path to said first node and one or more associated probe response-messages triggered by receipt and local processing at said first node of the one or more probe test-messages being received via a network path from the first node by the second node;
   the respective probe measurements each relating to one or more network performance characteristics in respect of the network paths taken by the respective probe test-messages and the probe response-messages associated therewith and being dependent also on the local processing of the respective probe test-messages at the respective target nodes:
      comparing at least one first probe measurement with at least one second probe measurement, and in dependence on the comparison, assigning a weighting in respect of at least one of said first and second nodes;
      determining a network performance analysis measure according to a predetermined function dependent on at least one of said probe measurements and in dependence on the weighting assigned in respect of said at least one node.

* * * * *